US006814045B2

(12) United States Patent
Masters

(10) Patent No.: US 6,814,045 B2
(45) Date of Patent: Nov. 9, 2004

(54) ROTARY INTERNAL COMBUSTION ENGINE

(76) Inventor: Roy Masters, The Forge, 38A Church Street, North Creake, Fakenhan, Norfolk (GB), NR21 9AD (*) Notice: Subject to any disclaimer, the term of this patent is extended or adjusted under 35 U.S.C. 154(b) by 45 days.

(21) Appl. No.: 10/169,635

(22) PCT Filed: Dec. 18, 2000

(86) PCT No.: PCT/GB00/04871

§ 371 (c)(1),
(2), (4) Date: Sep. 6, 2002

(87) PCT Pub. No.: WO01/48356

PCT Pub. Date: Jul. 5, 2001

(65) Prior Publication Data

US 2003/0101962 A1 Jun. 5, 2003

(30) Foreign Application Priority Data

Dec. 23, 1999 (GB) ........................................ 9930265

(51) Int. Cl.[7] ........................ F01C 1/18; F01C 19/10; F01C 21/00; B60K 7/00; F02B 53/00

(52) U.S. Cl. ..................... 123/241; 123/232; 123/242; 418/199; 418/206.1; 418/206.6

(58) Field of Search ............................ 123/241, 242, 123/232, 246, 249; 418/206.6, 206.1, 199, 206.5

(56) References Cited

U.S. PATENT DOCUMENTS

| | | | | |
|---|---|---|---|---|
| 4,003,349 A | * | 1/1977 | v. Habsburg-Lothringen | 123/246 |
| 4,506,637 A | * | 3/1985 | Reinhold | 123/246 |
| 6,481,410 B1 | * | 11/2002 | Ogilvie | 123/246 |
| 6,668,787 B2 | * | 12/2003 | Masters | 123/245 |

FOREIGN PATENT DOCUMENTS

| | | | | |
|---|---|---|---|---|
| GB | 2313627 A | * | 12/1997 | F01C/1/18 |

* cited by examiner

*Primary Examiner*—Sheldon J Richter
(74) *Attorney, Agent, or Firm*—Graham, Curtin & Sheridan; Richard T. Laughlin

(57) ABSTRACT

There is provided a rotary internal combustion engine (20) comprising a plurality of rotors (21) each having a plurality of lobes (22) for intermeshing with lobes of other rotors to form successive combustion chambers. Axial seal elements (60, 61) are provided at the rotor tips and trailing tips of the rotors respectively. Circumferential axial edge seals (59) are also provided to interconnect the axial seals. The seals engage sealing plates (30) on each axial side of an engine housing (29) so as to effect the combustion chambers. Fuel inlets and ignition means are provided at suitable locations, as are exhaust means.

6 Claims, 15 Drawing Sheets

ROTARY INTERNAL COMBUSTION ENGINE

Figure 1A:
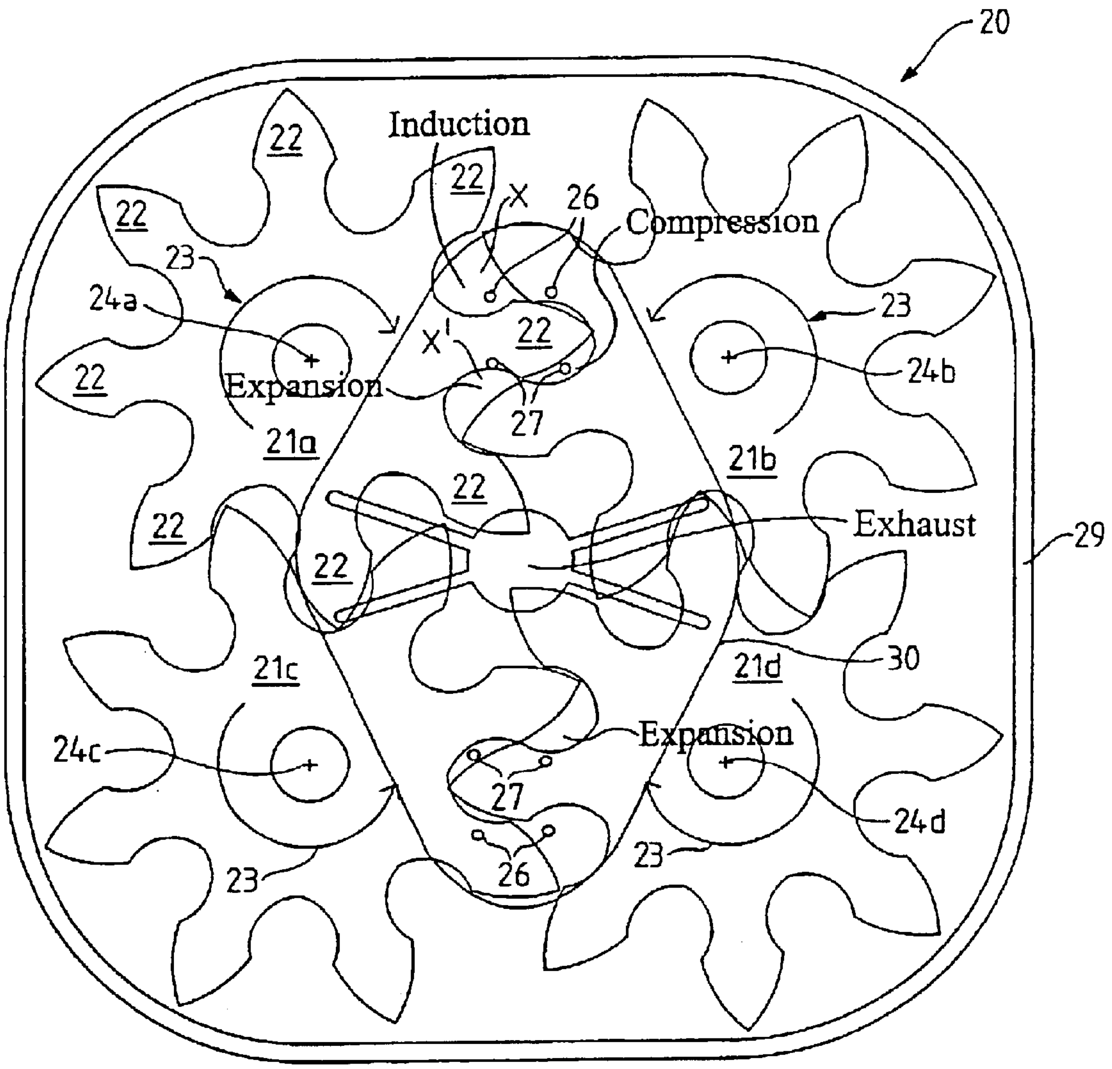

This invention relates to a rotary internal combustion engine. Rotary engines have a number of advantages over standard reciprocating engines. One advantage is the much smaller number of moving parts needed. In addition, with reciprocating engines a considerable amount of energy is wasted in stopping parts and then causing them to move in the opposite direction. Much vibration, heat and wear results from this.

According to a first aspect of the present invention there is provided a rotary internal combustion engine comprising two rotors mounted within a housing for rotation about respective central axes which are substantially parallel to each other, each rotor having a series of radially projecting lobes which are equally spaced circumferentially and which intermesh with the lobes of the other rotor to form successive combustion chambers as the rotors rotate, said housing being provided with a sealing plate on each axial side of the rotors, the sealing plates being in sealing engagement over an active area which axially seals each combustion chamber formed by the rotating intermeshing rotors throughout a full combustion cycle.

Preferably four intermeshing rotors are provided in two pairs, the central axes of the rotors being provided on the corners of a square, each pair of rotors providing said successive combustion chambers which are axially sealed by said sealing plates. In a preferred embodiment each sealing plate is generally diamond shaped, the short axis of which is generally parallel to imaginary lines extending between the central axes of each pair of rotors.

Another preferred feature is that the axially inward facing surface of one of the sealing plates is provided with a groove arrangement to facilitate escape of exhaust gasses. Ideally the groove arrangement comprises a central exhaust through bore equidistant from the central axes of all four rotors, with four angled grooves extending from the central bore towards the edges of the sealing plate. In some arrangements both sealing plates are provided with one of said groove arrangements.

A further preferred feature is that the peripheral edge of each sealing plate tapers outwardly in a direction axially away from the rotors. Also at least one of the sealing plates provides orifices for fuel delivery to the combustion chamber and at least one of the sealing plates provides ignition means.

According to a second aspect of the present invention there is provided a drive arrangement incorporating a rotary internal combustion engine comprising two rotors mounted within a housing for rotation about respective central axes which are substantially parallel to each other, each rotor having a series of radially projecting lobes which are equally spaced circumferentially and which intermesh with the lobes of the other rotor to form successive, sealed combustion chambers as the rotors rotate, the rotors each having a shaft which extends through the housing to engage a drive system for driving a driven member in rotation relative to the housing about a drive axis.

In a preferred arrangement the drive arrangement is mounted on an axle having the central drive axis, the housing is fixed relative to the axle and the drive member is driven in rotation about the axle and also the driven member is a wheel with a bearing disposed between the wheel and the axle.

Preferably the rotors are mounted in bearings in the housing and also the rotor shafts extending through the housing are attached to drive cogs which mesh with a cooperating drive ring mounted on the wheel.

It is a preferred feature that the axle incorporates an axial through bore for exhaust products, fuel delivery and electricity delivery for ignition means where necessary and a central tube for exhaust products is provided in the axial through bore and extends through the housing. In addition the housing is provided with communication means for the fuel delivery, electricity delivery for ignition means where necessary and for exhaust products.

Conveniently four intermeshing rotors are provided in two pairs, the central axes of the rotors being provided on the corners of a square, each pair of rotors providing said successive, sealed combustion chambers.

According to a third aspect of the present invention there is provided a rotary internal combustion engine comprising two rotors mounted within a housing for rotation about respective central axes which are substantially parallel to each other, each rotor having a series of radially projecting lobes which are equally spaced circumferentially and which intermesh with the lobes of the other rotor to form successive sealed combustion chambers, each lobe having a tip and a leading face in the direction of rotation, each tip and each leading face being provided with an axially extending strip seal arrangement each comprising an axially extending through slot formed in the rotor and a pair of axial seal elements retained in the slot, the axial seal segments each having a portion projecting beyond the rotor and being of the same axial length as the rotor.

With a preferred arrangement each axial face of each rotor is formed with a peripheral groove which communicates with the through slots and which houses an edge seal which sealingly links the axial seal segments. In some arrangements the edge seal for one axial face of each rotor is formed in lengths, each length being integrally formed with one of the axial seal segments of at least one pair of axial seal segments. Conveniently the edge seal for one axial face of each rotor is formed integrally with one of the axial seal segments of all of the pairs of axial seal segments, the edge seal for the other axial face being formed integrally with the other axial seal segments of all the pairs of axial seal segments.

Preferably the axial seal segments at the tips are urged radially outwardly and the axial seal segments in the leading faces are urged outwardly in the direction of rotor rotation. In one embodiment the axial seal segments at each rotor tip are urged radially outwardly by weights received in respective bores which communicate with the axial slot so that the weights can contact the inner ends of the axial seal segments and each rotor tip has two of said bores which are angled and which extend from opposite respective axial faces of the rotor, cross inside the lobe and extend to the axial slot. With some arrangements each pair of axial seal segments in each leading face is urged by spring means.

In certain preferred embodiments the edge seals are urged axially outwards by spring means. Conveniently said spring means comprises a number of through bores extending between the grooves on opposite axial faces, each through bore accommodating a spring disposed between two pistons to urge them into engagement with the oppositely disposed edge seals.

It is a preferred feature that each axial through slot has a first section opening to a second section inwardly thereof, the second section being wider than the first section such that the axial slot retains the axial seal segments and also that each pair of axial seal segments are mirror images of each other and have abutting planar surfaces.

Figure 1B:
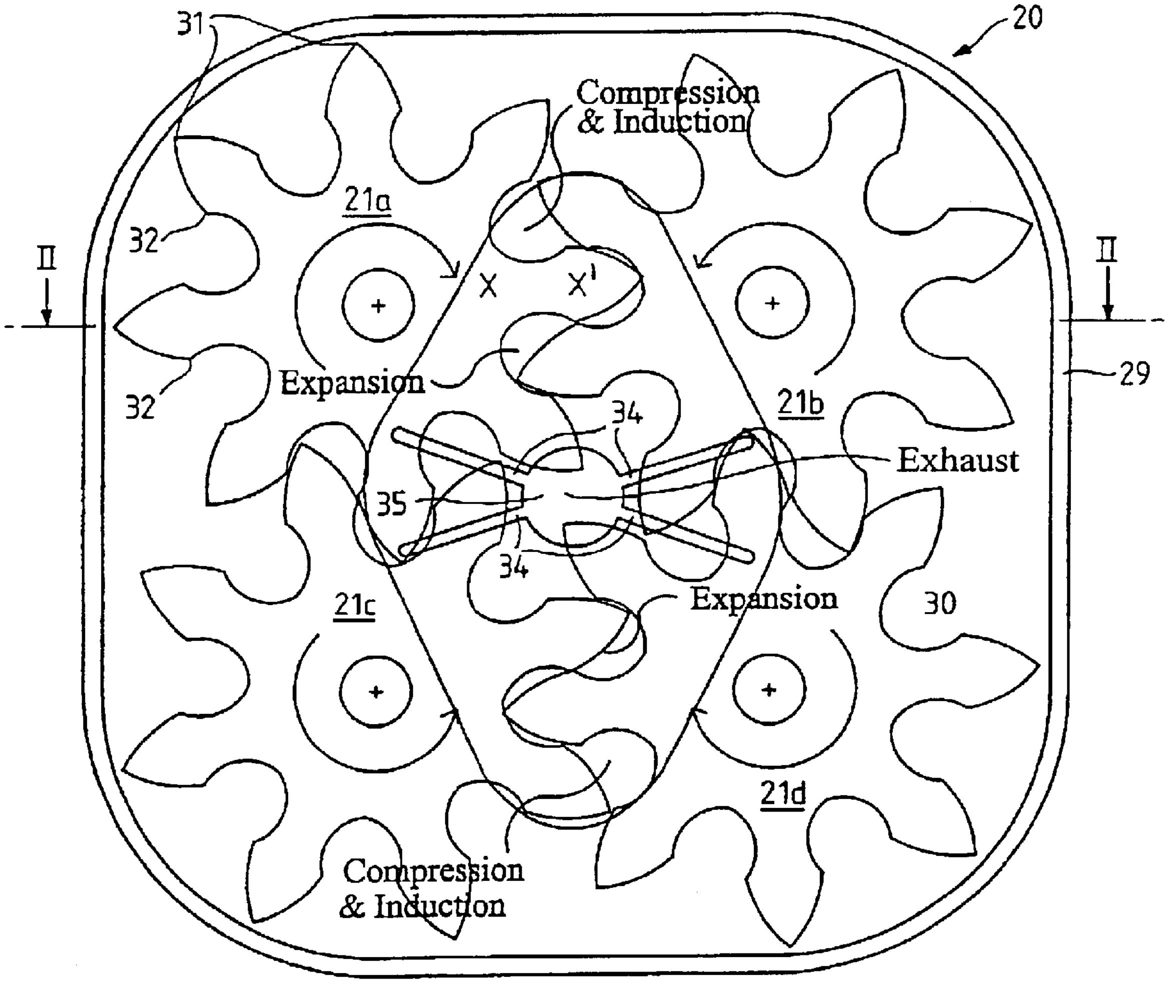
Figure 1C:
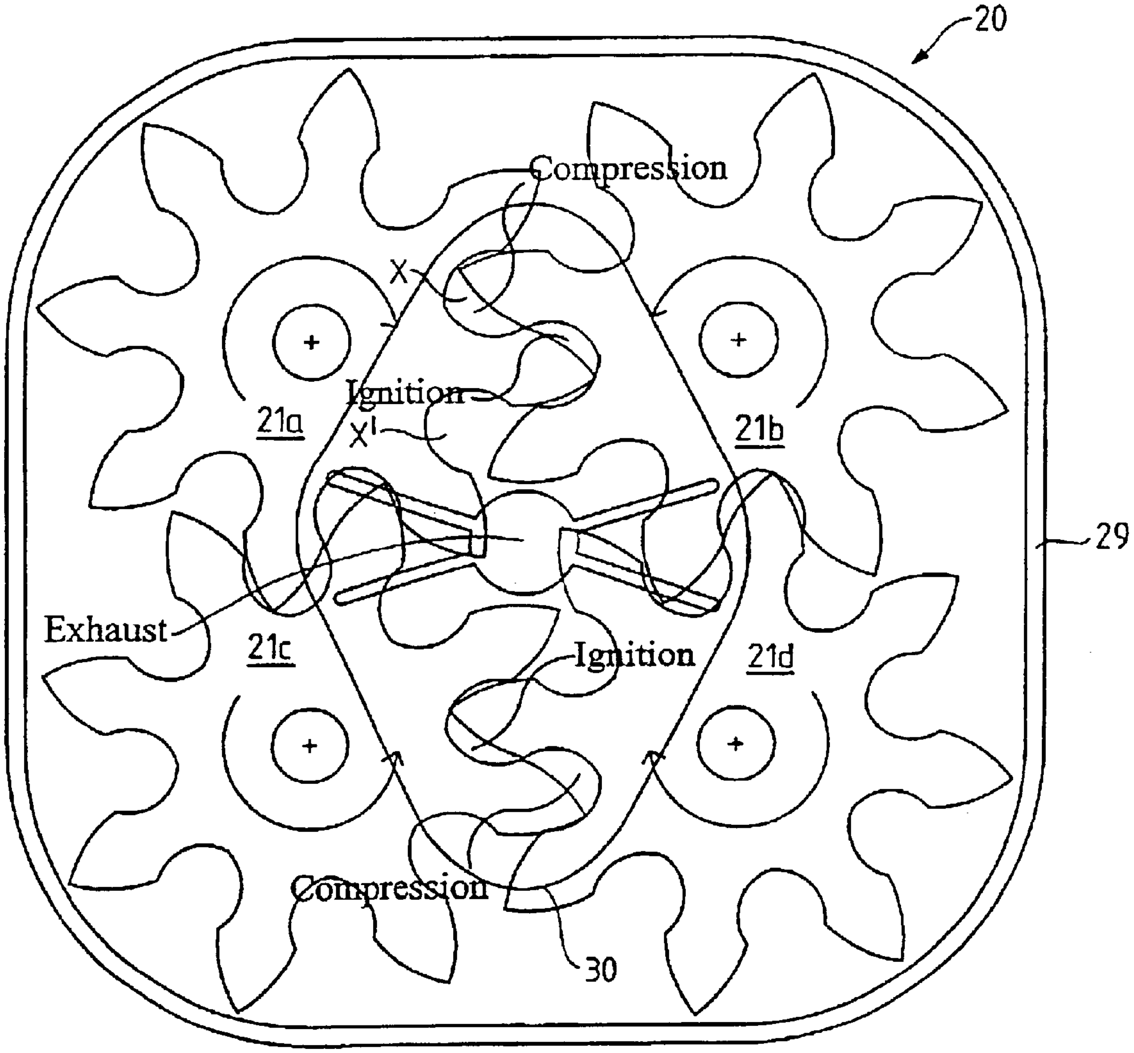
Figure 1D:
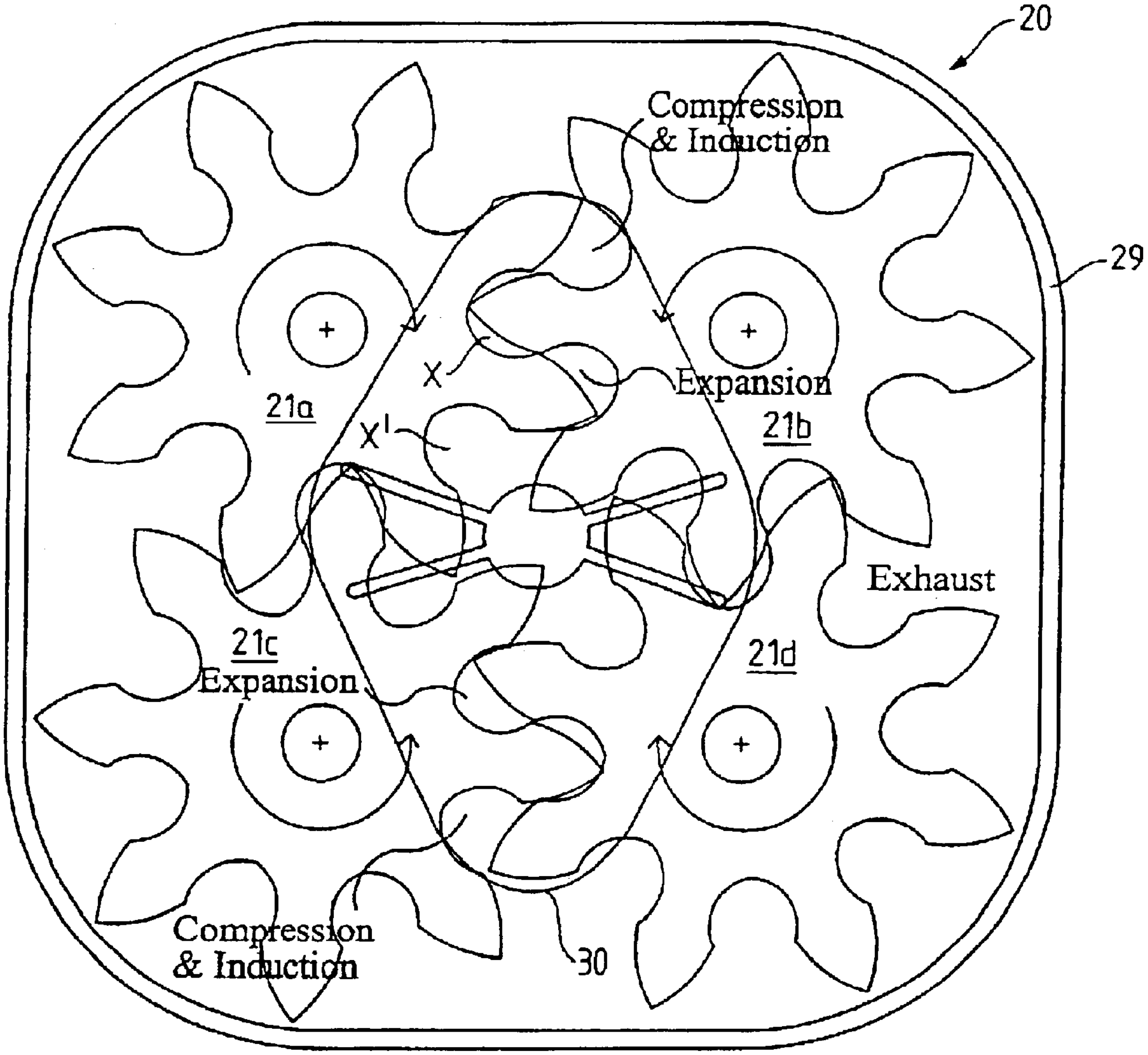
Figure 1E:
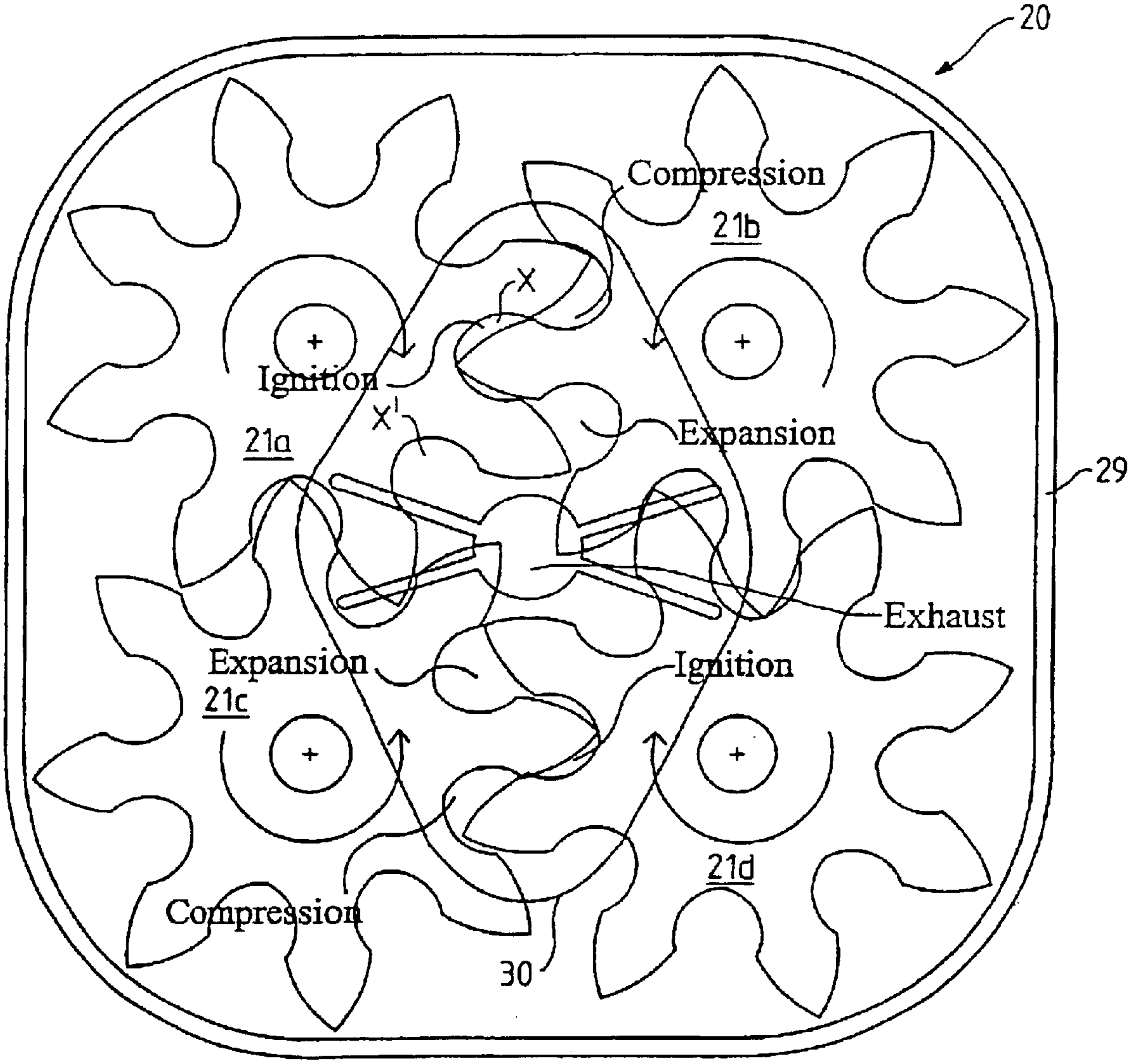
Figure 2:
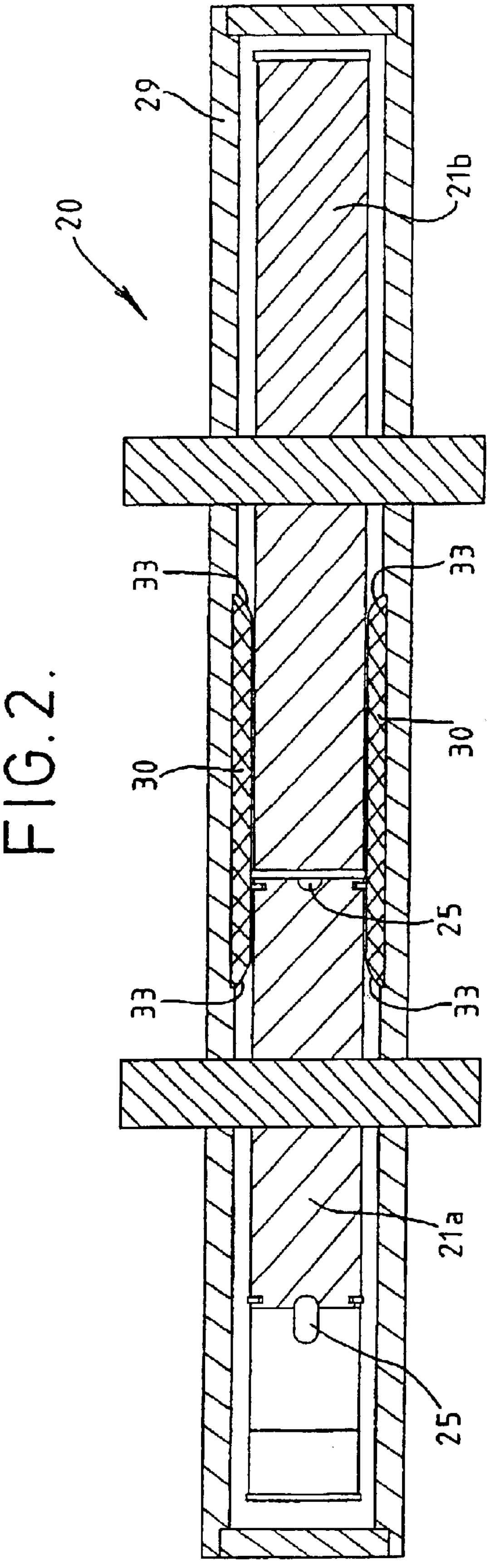
Figure 3:
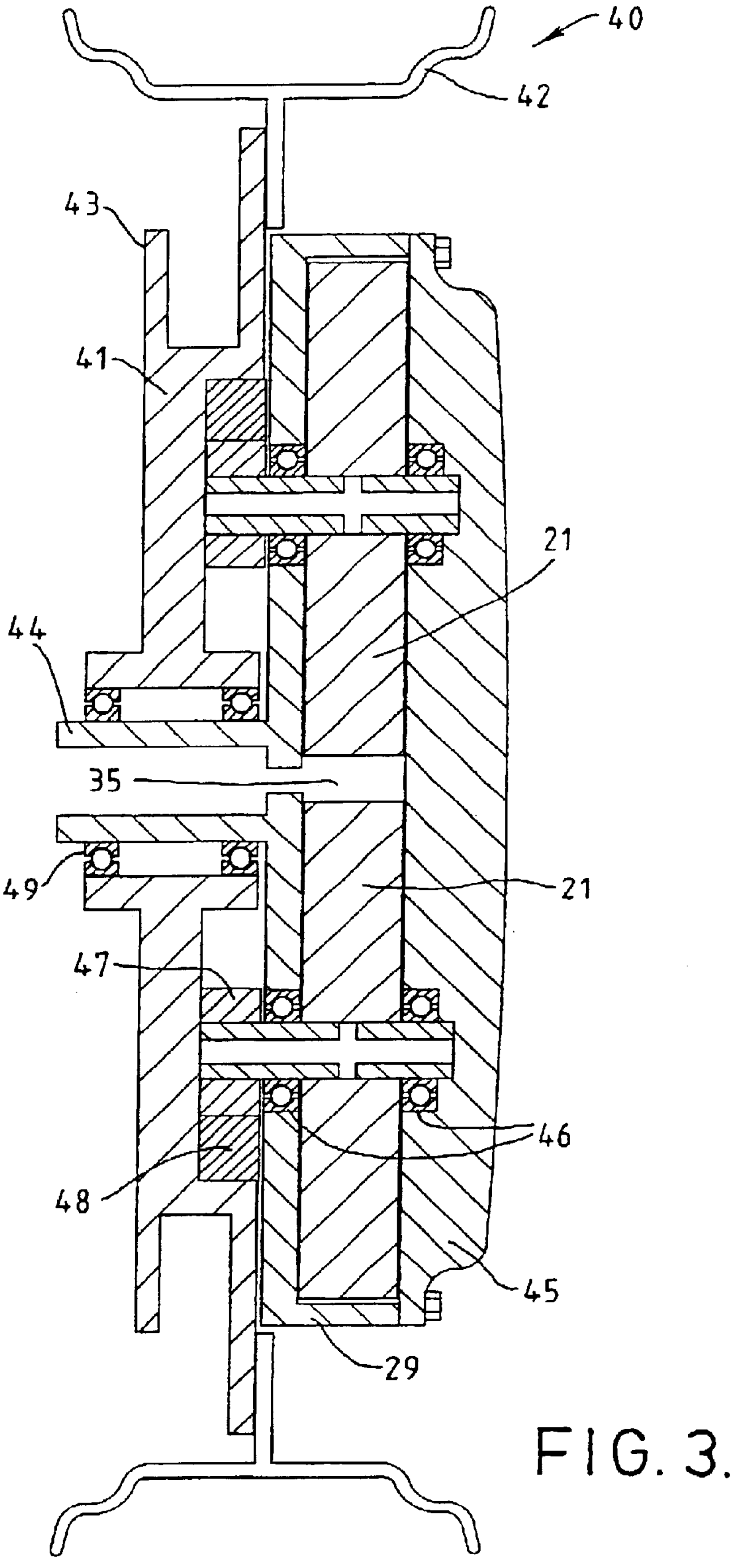
Figure 4:
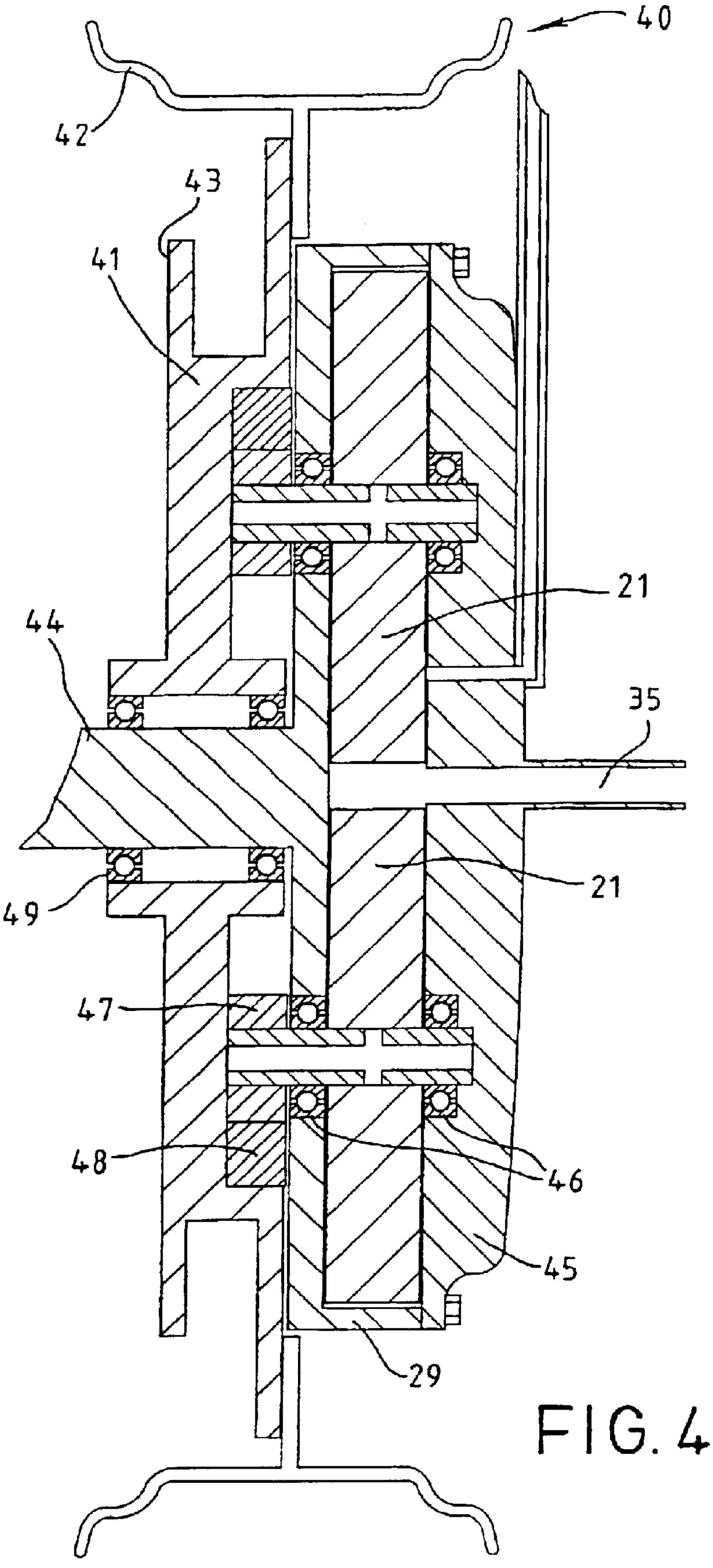
Figure 5:
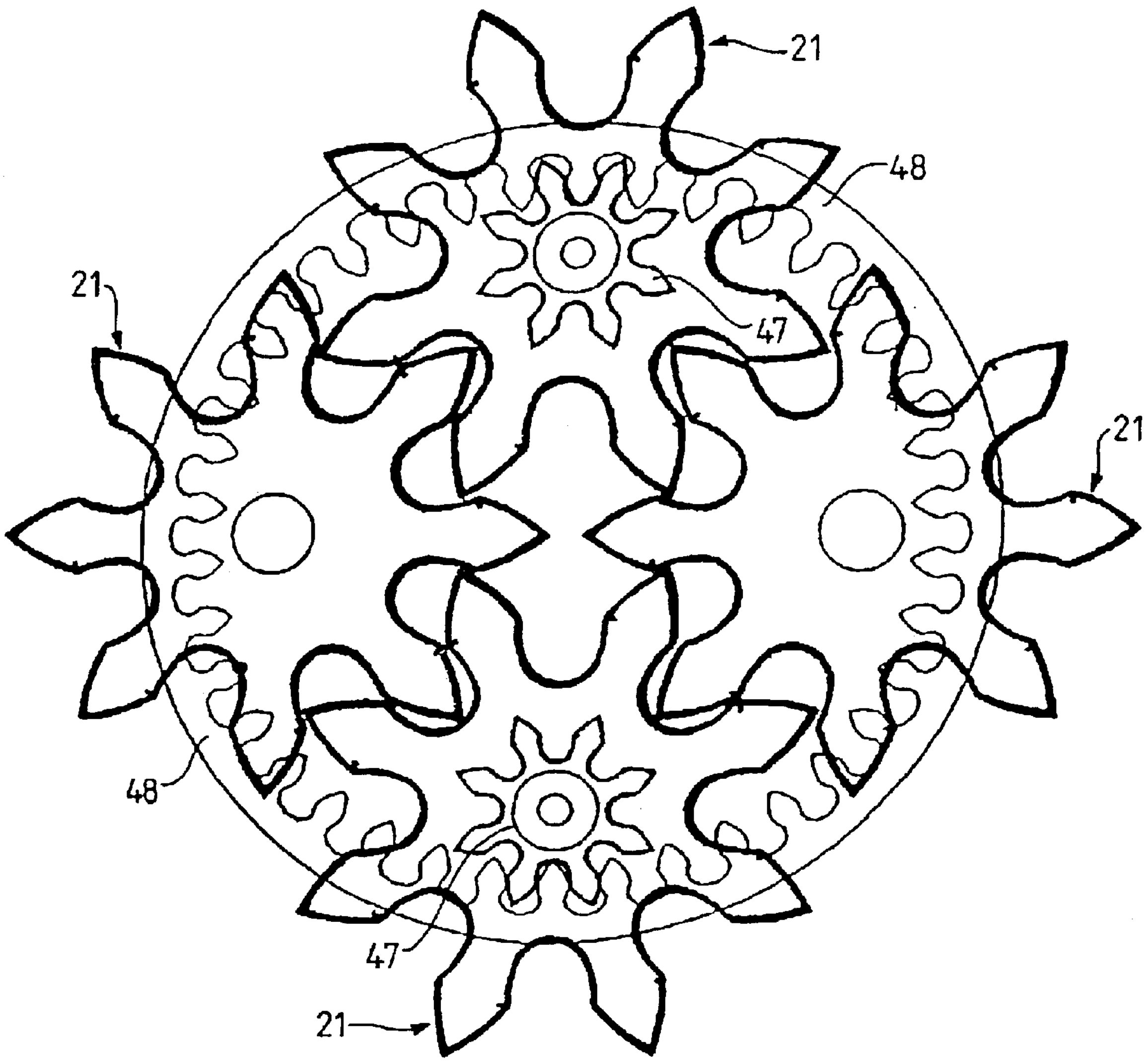
Figure 6:
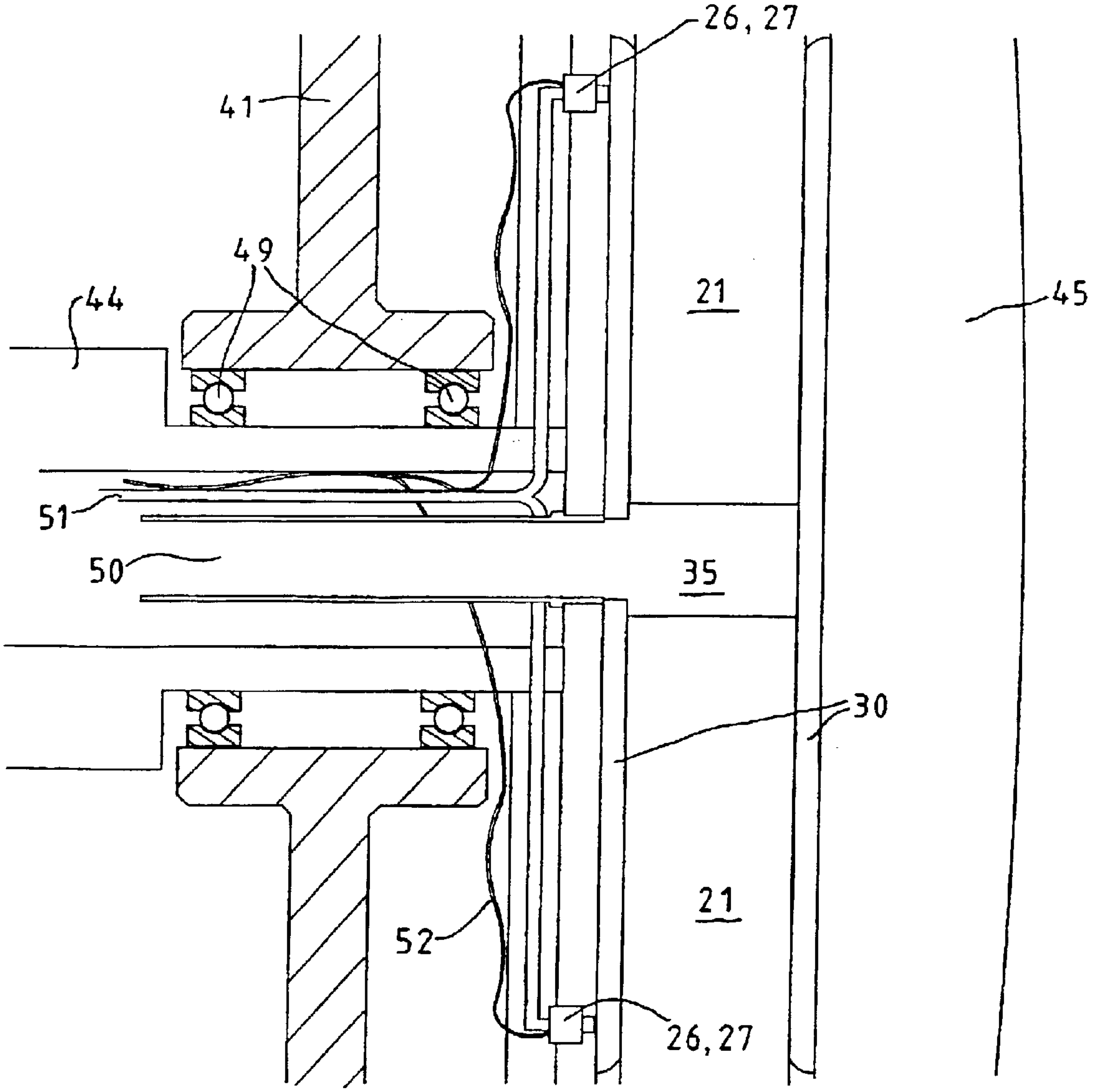
Figure 7:
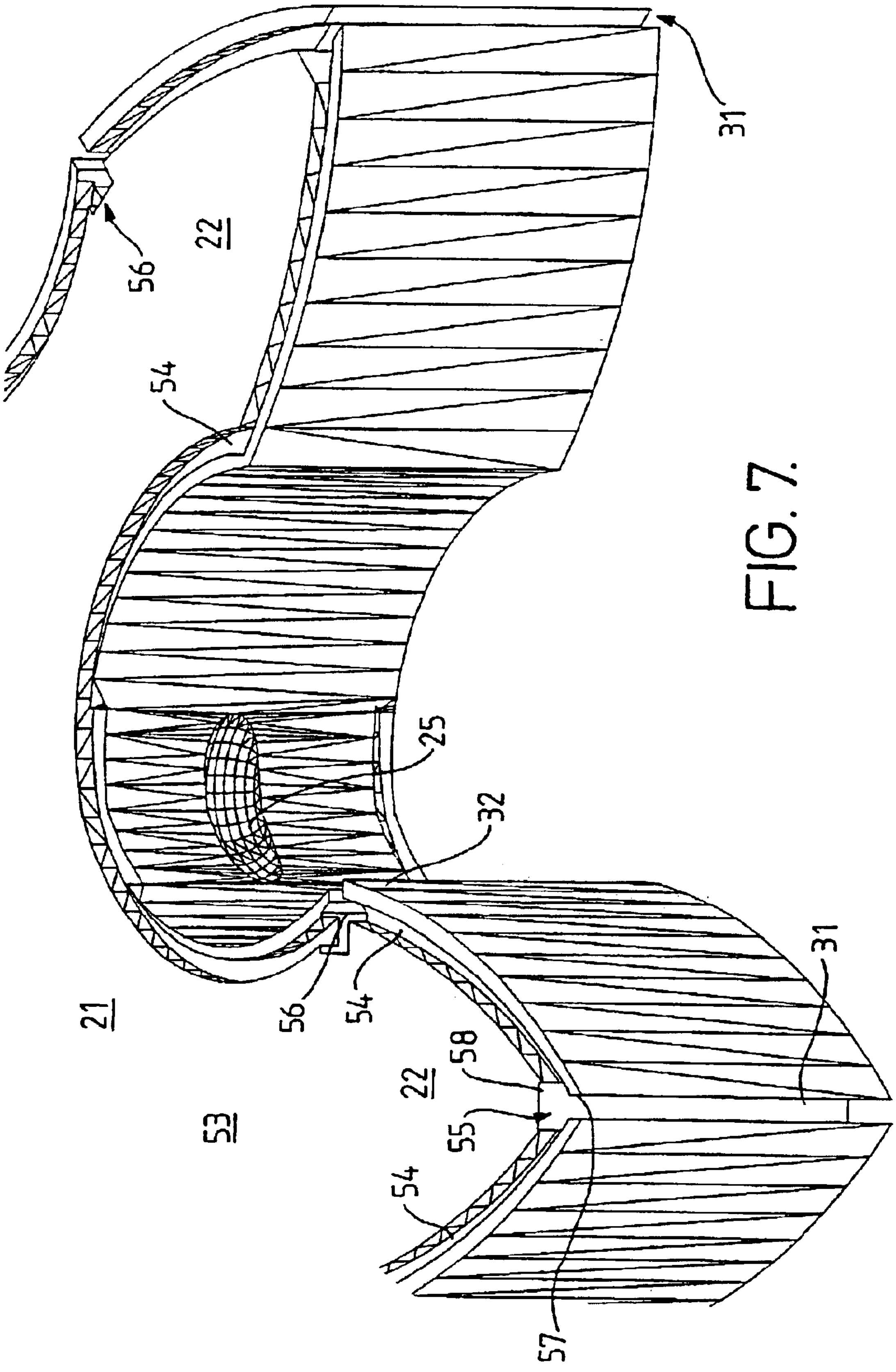
Figure 8:
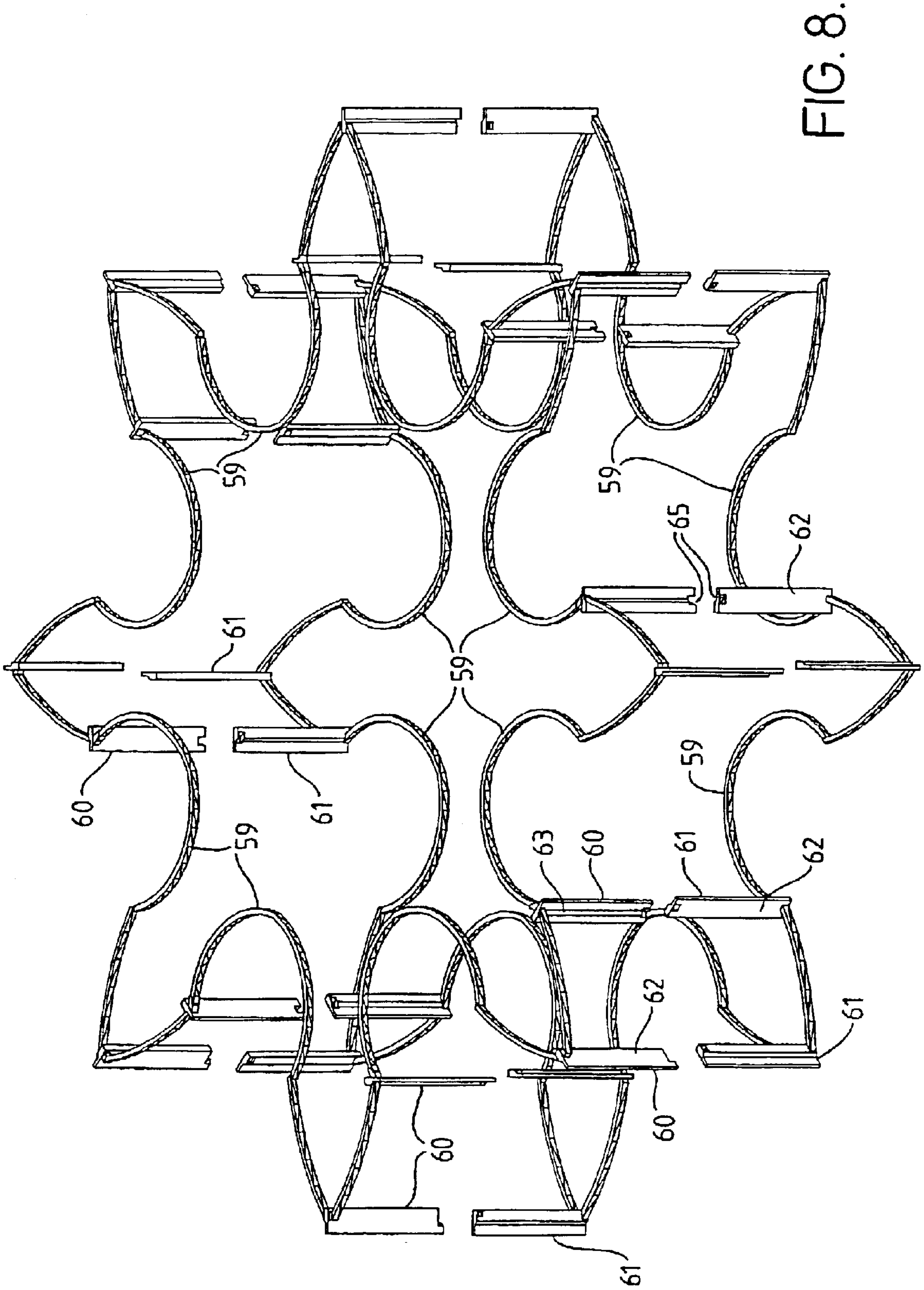
Figure 9:
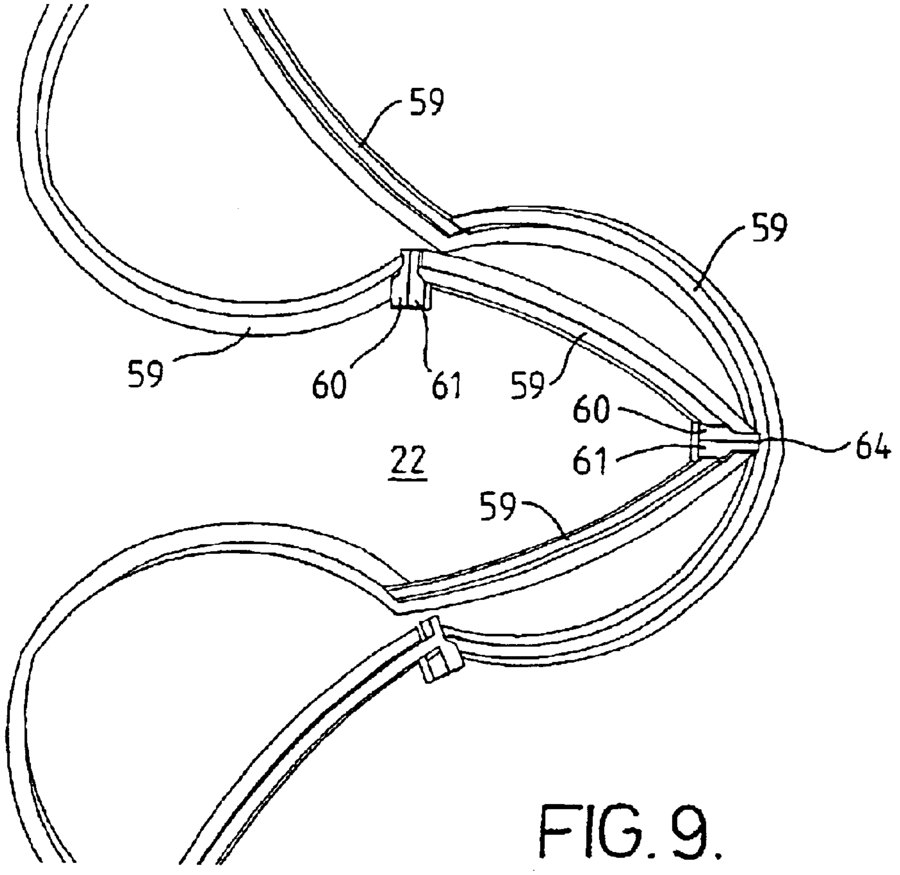
Figure 11:
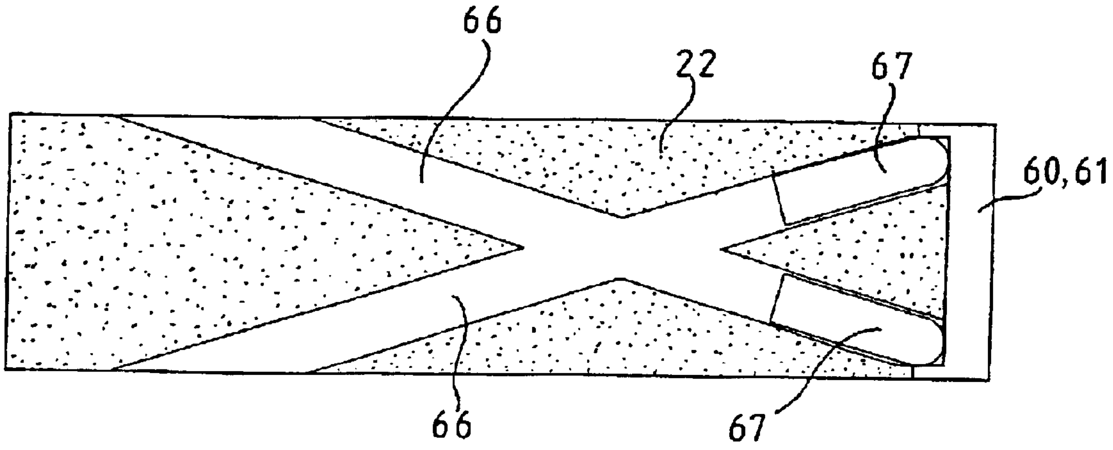
Figure 10:
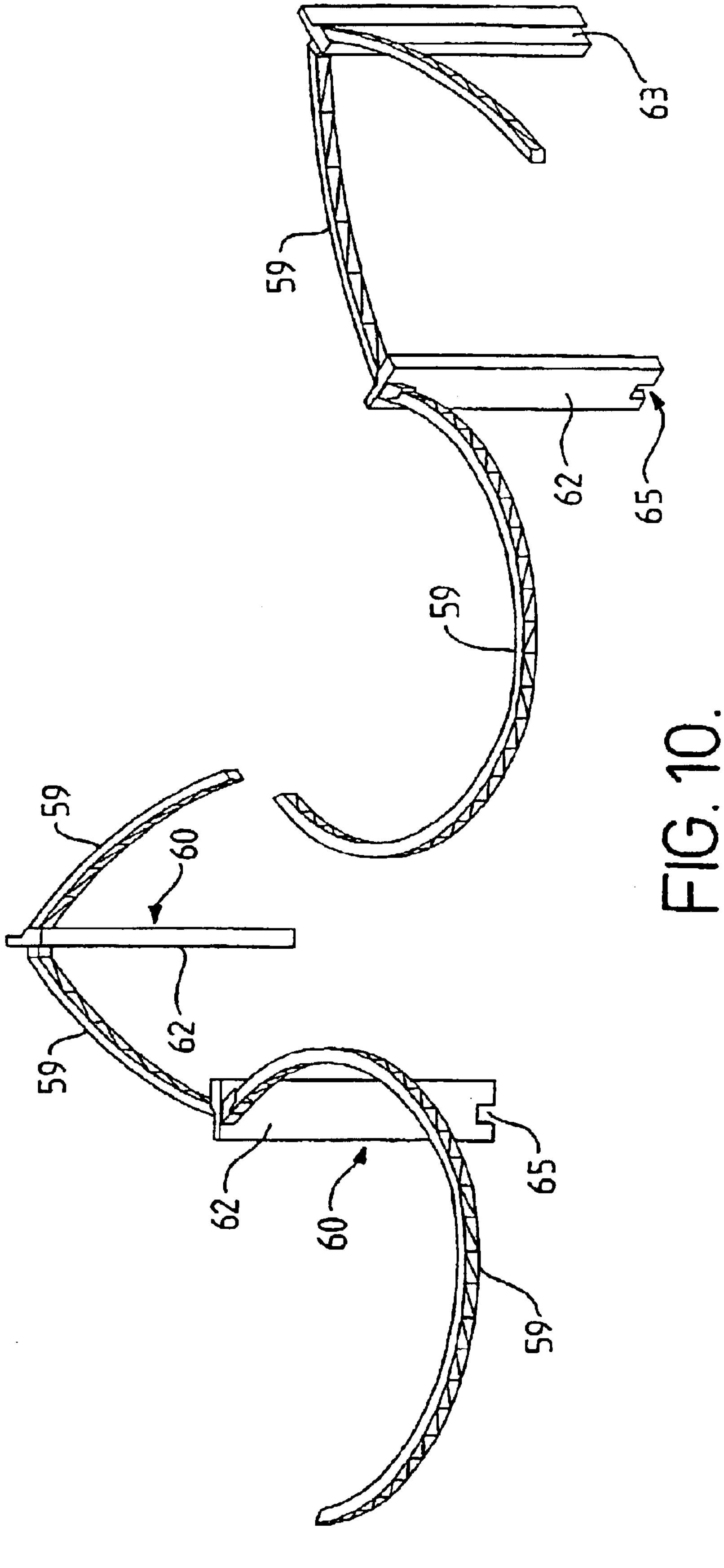
Figure 12:
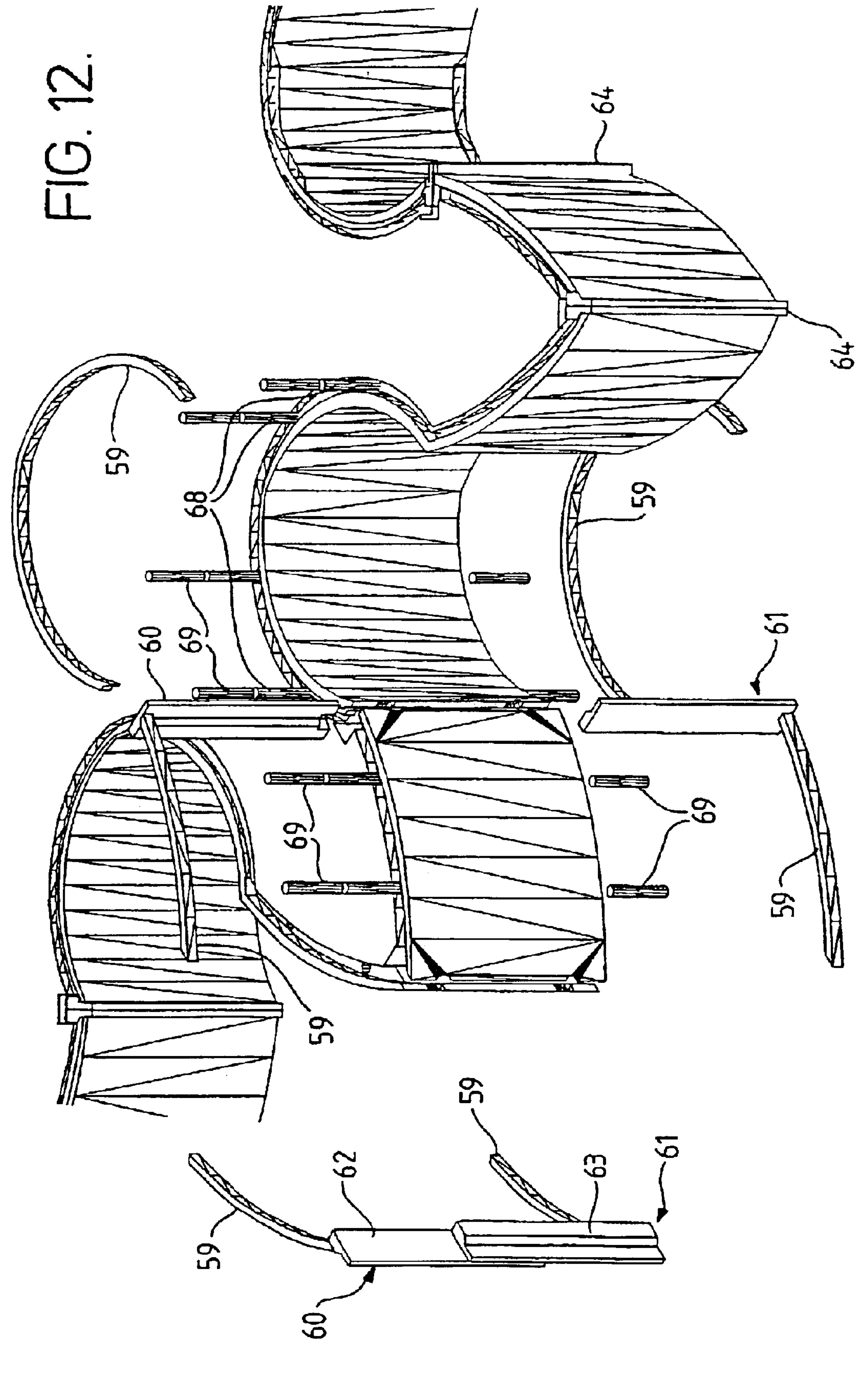

Embodiments of the present invention will now be described in more detail. The description makes reference to the accompanying drawings in which:

FIGS. 1*a* to 1*e* are schematic plan views of a rotary engine according to the present invention, FIG. 2 is a section on line II—II of FIG. 1*b*, FIG. 3 is a central lengthwise section through a wheel unit incorporating a rotary engine similar to that shown in FIGS. 1 and 2, FIG. 4 is a central lengthwise section through an alternative wheel unit incorporating a rotary engine similar to that shown in FIGS. 1 and 2, FIG. 5 is a schematic side view of the wheel unit of FIG. 4, FIG. 6 is a detailed central lengthwise section through a further wheel unit incorporating a rotary engine as shown in FIGS. 1 and 2, FIG. 7 is a perspective view of a part of one rotor of the engine shown in FIG. 1, FIG. 8 is a perspective view of a seal arrangement for use in the rotor shown in FIG. 7, FIG. 9 is an axial view of part of the rotor/seal combination, FIG. 10 is a perspective view of part of an alternative seal arrangement, FIG. 11 is a simplified section on a radial plane through a lobe of a rotor, and FIG. 12 is an exploded perspective view of part of a rotor and seal arrangement.

In the figures there are shown a number of embodiments of a rotary internal combustion engine 20 which is of the general type shown in GB 2313627A. In such engines 20 rotors 21 are provided with tooth-like projecting lobes 22 which intermesh with each other as shown in FIGS. 1*a* to 1*e*. In FIGS. 1*a* to 1*e* four rotors 21*a* to 21*d* are provided in a square arrangement. The respective rotors rotate in the direction of arrows 23 about respective axes 24*a* to 24*d*.

The shape of the lobes 22 of the rotors 21 is such that a succession of combustion chambers are formed as the rotors 21 rotate. In the area between each pair of lobes 22 there is a communication port, shown in this embodiment as a groove 25, which enables gases to move from a chamber at the leading face of a lobe to a chamber at the trailing face of the lobe and this will become clearer in due course.

FIG. 1*a* also shows fuel injection points 26 and ignition means 27 although if the engine 20 is a diesel engine then the ignition means 27 will not be required. The injection points 26 and ignition means have not been shown in FIGS. 1*b* to 1*e* to prevent congestion of the drawings.

As shown in FIGS. 1 and 2, the rotors 21*a* to 21*d* are mounted on respective shafts 28*a* to 28*d* and are disposed within an engine housing 29. On each axial face of the housing 29 is a sealing plate 30 which in this embodiment is generally diamond shaped. Clearly the combustion chambers of the engine 20 must be sealed in order for the engine to operate and so the rotors are provided with suitable seals around the perimeters of their axial faces and at the radially outermost tips 31 of the lobes 22 and at the rearmost points 32 of the lobes 22.

The dimensions of the sealing plates 30 are such that they do not extend over the entire axial area defined by the rotors 21. Instead the areas covered by the sealing plates 30 are the areas defined by the sealed combustion chambers as they perform the operating cycle of the engine. Some extra area is covered as a safety margin and so that each sealing plate 30 is an easily formable shape.

It will also be seen from FIG. 2 that the sealing plates 30 taper at their outermost edges 33 to provide lead-in surfaces for the seals as they approach the areas in which sealed combustion chambers are to be formed.

The reduced dimensions of the sealing plates 30 compared to the entire axial area defined by the rotors reduce the friction between the rotors 21 and the stationery parts of the engine 20. The result of this is improved engine efficiency and reduced wear on the sealing arrangement.

The sealing plate 30 on at least one axial side of the rotors 20 is also provided with a series of grooves 34 which terminate at a central opening 35 in the sealing plate 30 and engine housing 29. The grooves 34 and opening 35 facilitate the escape of the exhaust gases from the combustion chambers.

FIGS. 1*a* to 1*e* show the basic cycle of operation of the engine 20. The cycle of operation of the engine will, however, only be discussed briefly as it is already known from GB 2313627A. Concentrating on a single chamber X, in FIG. 1*a* it is still in an open, induction stage. In FIG. 1*b* chamber X is sealed and the induced fuel/air mixture starts to be compressed. Compression continues in FIG. 1*c* and in FIG. 1*d* the gases move from the leading face to the trailing face of the lobe 22 by virtue of the groove 25 in the valley between the adjacent lobes. In FIG. 1*e* there is ignition. After ignition there is expansion, with chamber X now being indicated by chamber X' in FIG. 1*a* and 1*b*. In FIG. 1*c*, chamber X' opens to exhaust and this continues in FIGS. 1*d* and 1*e*.

In FIGS. 3 to 6 there are shown applications of the engine 20. FIG. 3 shows a wheel arrangement 40 comprising a rotary engine 20 of the general type discussed above coupled to a wheel 41 having a wheel rim 42. Attached to the wheel rim 42 would be some form of tyre, but this has not been shown. The wheel 41 also incorporates a brake disc 43 but the remainder of the brake arrangement has not been shown and this method of braking is shown only as an example.

The engine housing 29 incorporates a fixed axle 44 and a cover plate 45. The shafts of the rotors 21 are mounted in bearings 46 in the housing and two of the four shafts are attached to drive cogs 47. The drive cogs 47 mesh with a drive ring 48 which is fixedly mounted on the wheel 41. This is more clearly shown in FIG. 5. The wheel 41 in turn is mounted for rotation about the axle 44 by virtue of a bearing 49. The axle 44 is hollow and communicates with a central exhaust opening 35 of the engine housing 29. The hollow axle 44 also provides a route for the other engine services, i.e. fuel inlets to supply the fuel injection points 26 and electricity supply for the ignition means 27 which are not shown in FIG. 3.

It will be understood that operation of the engine 20 will cause rotation of the rotors 21 within the housing 29. This will effect rotation of the drive cogs 47 which will via the drive ring 48, rotate the wheel 41 relative to the axle 44.

The arrangement shown in FIG. 4 is very similar to the embodiment shown in FIG. 3 and so like parts have been given the same reference numerals. The principal difference between the two constructions is that in FIG. 4 the fixed axle 44 is not hollow. Fuel and electricity are supplied externally into the cover plate 45 and exhaust products escape directly through a central opening 35 in the cover plate 45. The invention is not limited to the illustrated arrangements however.

FIG. 6 shows a detail of an arrangement similar to that shown in FIG. 3 and so like parts have again been given like reference numerals. In this arrangement the housing 45 has a sealing plate 30 on each axial side of the arrangement of rotors 20 as discussed above in connection with FIGS. 1 and 2. FIG. 6 also shows more detail of a central exhaust passage 50 communicating with the central exhaust opening 35 of the inner sealing plate 30. The figure shows inlet tubes 51 and wires 52 for supplying fuel and electricity respectively to the fuel injection points and ignition means.

Suitable arrangements for effectively sealing the combustion chambers are shown more clearly with reference to FIGS. 7 to 12. In FIG. 7 there is shown part of one rotor 21, a pair of lobes 22 and a transfer groove 25 being clearly visible. Each axial face 53 of the rotor 21 is provided with a shallow groove 54 which extends around the periphery of the rotor 21. At the radially outermost tip 31 of each lobe 22 is an axially extending slot 55 which extends from one axial face 53 to the other. The trailing tip 32 of each lobe 22 is also provided with an axially extending slot 56 which extends from one axial face 53 to the other. The slots 55, 56 interrupt the shallow groove 54 on each axial face of the rotor 21. Each slot 55, 56 has an axially extending opening 57 which is narrower than the interior portion 58 of the slot, the junction between the narrow and wider portions being tapered.

The shallow grooves 54 accommodate elongate edge seals 59 which in FIG. 8 are shown as being continuous around the entire periphery of each axial face of the rotor 21. Depending from the edge seal 59 at suitable locations are axial seal elements 60 which have one side shaped for engagement with corresponding axial seal elements 61 depending from the elongate edge seal 59 for the other axial face of the rotor 21.

Each pair of corresponding axial seal elements 60, 61 are disposed in one of the slots 55, 56 and are shown in this arrangement has having flat inner surfaces 62 in abutment with each other. The outer surfaces 63 are shaped to fit the opening 57, tapered portion and the interior portion of the slots 55, 56. The free ends 64 of the axial seal elements 60, 61 project in use externally of the rotor 21 so as to form sealing points.

It will be seen that notches 65 are formed in the free ends of the axial seal elements remote from the edge seal 59 for accommodating the edge seal 59 of the seal for the other axial side of the rotor 21. The free ends 64 of the axial seal elements 60, 61 are, however, not interrupted by the notches 65 and remain continuous for the full axial width of the axial seal elements 60, 61.

In FIG. 10 there is shown an alternative seal arrangement which is similar to FIG. 8 in many respects and so like parts have been given the same reference numerals. Essentially in FIG. 10 the elongate edge seals 59 are split into sections which combine to form a complete seal arrangement.

In FIGS. 11 and 12 are shown non-limiting examples of possible arrangements for urging the seals 59, 60 and 61 outwards into sealing engagement with the surfaces with which seals are to be formed. FIG. 11 shows two angled bores 66 each of which extends between the axial face of the rotor 21 and the slot 55 at the lobe tip 31. A pair of such bores 66 are provided for each lobe 22. In each bore 66 is a weight 67 and the pair of weights 67 for each lobe 22 act to urge the axial seal elements 60, 61 outwardly by virtue of centrifugal force when the rotors 21 are rotating.

In FIG. 12 there is shown a method for urging the edge seals 59 axially outwards. A number of axially extending through holes are formed in the rotor so as to interconnect the shallow grooves 54 on both axial sides of the rotor 21. In each hole is provided a spring 68 and a pair of rods 69, one on each axial side of the spring 68. The spring 68 and rods 69 are inserted prior to the elongate seals 59 being inserted into the shallow groove 54 and act to urge the elongate seals axially outwards. Equal force is thus exerted on the seals 59 on each axial side of the rotor 21.

It will be appreciated that other methods could be used to bias the seal elements 60, 61 outwardly such as springs and also to bias the elongate seals 59 axially outwards.

Although the above embodiments have all been described with reference to an engine 20 having four rotors 21 arranged in a square formation and having eight lobes 22, it will be understood by the skilled person that other arrangements are possible with different numbers of rotors and lobes. Also, other lobe shapes are possible as long as sealed combustion chambers can be formed.

With four rotors having for example eight protrusions each, it is possible to achieve 210 degrees of combustion in one cycle, i.e. one complete revolution of the rotors. However, the invention is not limited to the use of four rotors. For example, by axially overlaying one set of rotors with a second set, on the same shafts and angularly offsetting the second set by, 11.5 degrees with respect to the first set, it is possible to achieve continuous combustion.

Moreover four or more rotors can be intermeshed in the same plane, to increase the overall capacity, producing a large flat engine. Typically four rotors each with eight protrusions can reasonably provide an engine of about 240 cc capacity, but this is just a non-limiting example. However, the capacity can be varied by using axially thicker or thinner rotors or by increasing the size of the rotors in both directions.

However, in the case of a motor vehicle, it is envisaged that an engine in accordance with the invention, which can be flat, could be provided for, and fit neatly in each wheel of that vehicle, for example in association with electronic control, and/or gearbox, and/or torque converter, and/or clutch, or conceivably even by direct drive associated with means for immobilising the vehicle until the engines are rotating sufficiently fast to fire.

By virtue of electronic or computer control, it will then be possible to adjust the speed of each wheel according to the required road speed of the wheel, i.e. when cornering, and to prevent wheel slip on accelerating and deceleration or braking, this would allow vehicles with multiple wheels to become all wheel drive, and conceivably all wheel steering.

In addition, in relation to FIGS. 3 to 6 the engine 20 is shown as part of a wheel arrangement. Other drive arrangements are, however, possible instead of a drive for a wheel. For example, the wheel could be replaced by a propeller for an aircraft or for a watercraft or for a landcraft such as a hovercraft.

List of Reference Numerals

| | |
|---|---|
| 20 | Engine |
| 21 | Rotor |
| 22 | Lobe |
| 23 | Rotation direction |
| 24 | Axis of rotation |
| 25 | Communication port, groove. |
| 26 | Fuel injection point |
| 27 | Ignition means |
| 28 | Shaft |
| 29 | Housing |
| 30 | Sealing plate |
| 31 | Lobe tip |
| 32 | Lobe rearmost point |
| 33 | Sealing plate edge |
| 34 | Groove |
| 35 | Central opening |
| 40 | Wheel arrangement |
| 41 | Wheel |
| 42 | Wheel rim |
| 43 | Brake disc |
| 44 | Fixed axle |
| 45 | Cover plate |
| 46 | Bearing |

-continued

| List of Reference Numerals | |
|---|---|
| 47 | Drive cogs |
| 48 | Drive ring |
| 49 | Bearing |
| 50 | Exhaust passage |
| 51 | Inlet tubes |
| 52 | Wires |
| 53 | Axial face of rotor |
| 54 | Shallow groove |
| 55 | Axial slot |
| 56 | Axial slot |
| 57 | Axial opening |
| 58 | Interior portion |
| 59 | Edge seal |
| 60 | Axial seal element |
| 61 | Axial seal element |
| 62 | Inner surface of axial seal element |
| 63 | Outer surface of axial seal element |
| 64 | Free end of axial seal element |
| 65 | Notch |
| 66 | Angled bore |
| 67 | Weight |
| 68 | Spring |
| 69 | Rod |

What is claimed is:

1. A rotary internal combustion engine comprising two rotors mounted within a housing for rotation about respective central axes which are substantially parallel to each other, each rotor having a series of radially projecting lobes which are equally spaced circumferentially and which intermesh with the lobes of the other rotor to form successive combustion chambers as the rotors rotate, said housing being provided with a sealing plate on each axial side of the rotors, the sealing plates being in sealing engagement over an active area which axially seals each combustion chamber formed by the rotating intermeshing rotors throughout a full combustion cycle, wherein the peripheral edge of each sealing plate tapers outwardly in a direction axially away from the rotors.

2. A rotary internal combustion engine comprising two rotors mounted within a housing for rotation about respective central axes which are substantially parallel to each other, each rotor having a series of radially projecting lobes which are equally spaced circumferentially and which intermesh with the lobes of the other rotor to form successive combustion chambers as the rotors rotate, said housing being provided with a sealing plate on each axial side of the rotors, the sealing plates being in sealing engagement over an active area which axially seals each combustion chamber formed by the rotating intermeshing rotors throughout a full combustion cycle, wherein four intermeshing rotors are provided in two pairs, the central axes of the rotors being provided on the corner of a square, each pair of rotors providing said successive combustion chambers which are axially sealed by said sealing plates and wherein each sealing plate is generally diamond shaped, the short axis of which is generally parallel to imaginary lines extending beyond the central axes of each pair of rotors.

3. A rotary internal combustion engine comprising two rotors mounted within a housing for rotation about respective central axes which are substantially parallel to each other, each rotor having a series of radially projecting lobes which are equally spaced circumferentially and which intermesh with the lobes of the other rotor to form successive combustion chambers as the rotors rotate, said housing being provided with a sealing plate on each axial side of the rotors, the sealing plates being in sealing engagement over an active area which axially seals each combustion chamber formed by the rotating intermeshing rotors throughout a full combustion cycle, and wherein at least one of the sealing plates provides orifices for fuel delivery to the combustion chamber.

4. An engine as claimed in claim 3 wherein at least one of the sealing plates provides ignition means.

5. A rotary internal combustion engine comprising two rotors mounted within a housing for rotation about respective central axes which are substantially parallel to each other, each rotor having a series of radially projecting lobes which are equally spaced circumferentially and which intermesh with the lobes of the other rotor to form successive sealed combustion chambers, each lobe having a tip and a leading face in the direction of rotation, each tip and each leading face being provided with an axially extending strip seal arrangement each comprising an axially extending through slot formed in the rotor and a pair of axial seal elements retained in the slot, the axial seal segments each having a portion projecting beyond the rotor and being of the same axial length as the rotor, wherein each axial through slot has a first section opening to a second section inwardly thereof, the second section being wider than the first section such that the axial slot retains the axial seal segments.

6. An engine as claimed in claim 5 wherein each pair of axial seal segments are mirror images of each other and have abutting planar surfaces.

* * * * *